UNITED STATES PATENT OFFICE.

HORACE T. BROWN AND GEORGE HARRIS MORRIS, OF BURTON-ON-TRENT, ENGLAND.

PROCESS OF PREPARING RAW GRAIN.

SPECIFICATION forming part of Letters Patent No. 490,538, dated January 24, 1893.

Application filed March 18, 1891. Serial No. 385,481. (No specimens.) Patented in England May 20, 1890, No. 7,880, and in Belgium March 6, 1891, No. 94,041.

*To all whom it may concern:*

Be it known that we, HORACE TABBERER BROWN, residing at 47 High Street, Burton-on-Trent, in the county of Stafford, and GEORGE HARRIS MORRIS, residing at Alexander Road, Burton-on-Trent, in the county of Derby, England, citizens of England, have invented a new and useful Process of Preparing Raw Grain or other Amylaceous Substances for Mashing in Brewing or Distilling Operations, (for which we have obtained a patent in Great Britain, dated May 20, 1890, No. 7,880, and in Belgium, dated March 6, 1891, No. 94,041,) of which the following is a specification.

This invention relates to a process for treating raw grain or other amylaceous substances in such a manner as to render them available for direct use in the ordinary mashing operations for brewing or distilling. The process for this purpose which we are about to describe is founded on a discovery made by us and published in England in the *Journal of the Chemical Society* for 1890, pages 458 to 528. Before publication of this discovery, there were several methods, more or less objectionable, known and practiced for preparing raw grain for brewing and distilling, all including as necessary steps the gelatinizing of the starch and then its saccharification by diastase. In some cases, as described in *Brewing with Raw Grain*, pages 45-51, Lovibond, London, 1883, the starch was gelatinized and rendered accessible to diastase by treatment with water at or above boiling point, but this process was subject to serious practical objections. In other cases, as described by Billings, Patent No. 398,374, the grain was mixed with kiln-dried malt at temperatures up to 170° Fahrenheit. According to both these processes a small amount of saccharification was probably effected on application of diastase, because the heat caused rupture of some of the cellulose tissue in which the starch granules of raw grain are always inclosed, and thus gave access for the diastase to operate on the starch. It was not, however, until we the present applicants discovered, that in green or air dried malt but not in kiln dried malt there exists a soluble ferment, cytase, which is killed at a temperature of 130° Fahrenheit but which at lower temperatures completely dissolves away the cellulose tissue that incloses the starch granules, and thus renders the whole of these granules accessible to diastase for saccharification. We apply this, our discovery of cytase and its property, in preparing raw grain or other amylaceous substances for mashing in the following manner. When raw grain is to be treated, we crush or grind it and mix it with water and green or air dried malt made from barley or other suitable grain. The proportions of the mixture may vary, practically we find that from ten to fifteen parts by weight of the malt may be mixed with one hundred parts of raw grain. Instead of using the green or air dried malt itself, an infusion of the green or air dried malt may be employed. When other amylaceous bodies are used instead of grain, they are, in the first instance, pulped or otherwise reduced to a suitable consistence for admixture. The materials, that is to say, the crushed raw grain or the amylaceous pulp with the green malt or its infusion are thoroughly mixed in a vessel provided with an agitator and jacketed or otherwise arranged for varying or maintaining the temperature of its contents, which should not exceed 120° Fahrenheit. After digesting for a time, the walls of the cells containing the starch granules become dissolved, leaving the starch free to be acted on for saccharification, and thus the whole of the material becomes so far modified in its constitution that it can be used along with ordinary malt for production of wort by mashing in the usual way.

By treating grain or amylaceous materials in the manner above described, we dispense with the gelatinizing of the starch at high temperatures, an operation which is essential in all the known processes for rendering these substances available for mashing. As the maximum temperature which we employ is not sufficient to sterilize the material, it is of advantage to add a small proportion of antiseptic, such as bisulphite of lime, which will not affect the subsequent process of saccharification or the flavor of the ultimate product.

Having thus described the nature of our invention and the best means we know for carrying the same into practical effect, we claim:—

The herein described process for preparing raw grain or other amylaceous substances for mashing, by mixing the ground or pulped material with water and green or air dried malt or infusion thereof, and digesting the mixture at a temperature not exceeding 120° Fahrenheit so that the cytase dissolves the walls of the starch containing cells and renders the starch granules accessible to diastase for saccharification.

In testimony whereof we have signed our names to this specification, in the presence of two subscribing witnesses, this 4th day of March, A. D. 1891.

HORACE T. BROWN.
G. HARRIS MORRIS.

Witnesses:
FREDK. G. SMITH,
J. A. WHITFIELD,
*Clerks to Mr. Geo. Burton, Notary Public, Burton-on-Trent.*